United States Patent
Sharifi et al.

(10) Patent No.: US 10,755,171 B1
(45) Date of Patent: Aug. 25, 2020

(54) HIDING AND DETECTING INFORMATION USING NEURAL NETWORKS

(71) Applicant: Google LLC, Mountain View, CA (US)

(72) Inventors: Matthew Sharifi, Kilchberg (CH); Alexander Mordvintsev, Zürich (CH)

(73) Assignee: Google LLC, Mountain View, CA (US)

( * ) Notice: Subject to any disclaimer, the term of this patent is extended or adjusted under 35 U.S.C. 154(b) by 904 days.

(21) Appl. No.: 15/203,676

(22) Filed: Jul. 6, 2016

(51) Int. Cl.
*G06N 3/08* (2006.01)
*G06N 20/00* (2019.01)

(52) U.S. Cl.
CPC ............... *G06N 3/08* (2013.01); *G06N 20/00* (2019.01)

(58) Field of Classification Search
CPC ..... G06T 1/0021; H04N 1/32144; G06N 3/08
See application file for complete search history.

(56) References Cited

U.S. PATENT DOCUMENTS 8,081,816 B1 * 12/2011 Irick .................. G06K 9/00979
382/156
2005/0111723 A1 * 5/2005 Hannigan ............ G06Q 10/087
382/135

OTHER PUBLICATIONS

Sirota, Alexander A., Mikhail A. Dryuchenko, and E. Yu Mitrofanova. "Neural network functional models and algorithms for information conversion in order to create digital watermarks." Radioelectronics and Communications Systems 58.1 (2015): 1-10. (Year: 2015).*

(Continued)

*Primary Examiner* — Li B. Zhen
*Assistant Examiner* — Markus A. Vasquez
(74) *Attorney, Agent, or Firm* — Fish & Richardson P.C.

(57) ABSTRACT

Methods, systems, and apparatus, including computer programs encoded on computer storage media, for hiding information using neural networks. One of the methods includes maintaining data mapping each of a plurality of classes to a respective piece of information that may potentially be hidden in a received data item; receiving a new data item; receiving data identifying a first piece of information to be hidden in the new data item; and modifying the new data item to generate a modified data item that, when processed by a neural network configured to classify input data items belonging to one of the plurality of classes, is classified by the neural network as belonging to a first class of the plurality of classes that is mapped to the first piece of information in the maintained data.

28 Claims, 4 Drawing Sheets

(56) References Cited

OTHER PUBLICATIONS

Aliprand, Joan, et al. The Unicode standard version 3.0. Addison Wesley Longman Publishing Co., Inc., 1999 (Year: 1999).*

Goodfellow, Ian J., Jonathon Shlens, and Christian Szegedy. "Explaining and harnessing adversarial examples." arXiv preprint arXiv:1412.6572 (2014). (Year: 2014).*

Bansal and Bhadauria, "Watermarking Using Neural Network and Hiding the Trained Network within the Cover Image," Journal of Theoretical and Applied Information Technology, 2008, 4(8):663-670.

El'Arbi et al., "Video Watermarking Based on Neural Networks," IEEE International Conference on Multimedia and Expo, ICME'06, pp. 1577-1580, 2006.

Goodfellow et al., "Explaining and Harnessing Adversarial Examples," (Mar. 20, 2015) [online] (retrieved from fttp://arxiv.org/pdf/1412.6572.pdf), 11 pages.

Khare and Mishra, "Data Hiding by Using Neural Network in Video File," International Journal of Emerging Technology and Advanced Engineering, Jul. 2014, 4(7):913-917.

Szegedy et al., "Intriguing Properties of Neural Networks," (Feb. 19, 2014) [online] (retrieved from https://arxiv.org/pdf/1312.6199.pdf), 10 pages.

* cited by examiner

HIDING AND DETECTING INFORMATION USING NEURAL NETWORKS

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters. Neural networks may be trained on classification tasks and used to classify neural network inputs into a number of categories.

SUMMARY

In general, one innovative aspect of the subject matter described in this specification can be embodied in methods for maintaining data mapping each of a plurality of classes to a respective piece of information that may potentially be hidden in a received data item; receiving a new data item; receiving data identifying a first piece of information to be hidden in the new data item; and modifying the new data item to generate a modified data item that, when processed by a neural network configured to classify input data items belonging to one of the plurality of classes, is classified by the neural network as belonging to a first class of the plurality of classes that is mapped to the first piece of information in the maintained data.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations modifying the new data item to generate a modified data item comprises modifying the new data item using an adversarial example.

In some implementations modifying the new data item using an adversarial example comprises: backpropagating gradients to maximize a response of the neural network to classify the new data item as belonging to the first class of the plurality of classes that is mapped to the first piece of information in the maintained data; and modifying the data item using the backpropagated gradients.

In some cases maintaining data mapping each of a plurality of classes to a respective piece of information that may potentially be hidden in a received data item comprises: assigning a number (i) to each of the plurality of classes, and (ii) to each piece of information that may potentially be hidden in the received data item; and mapping each numbered class to a similarly numbered piece of information.

In some implementations the number of the plurality of classes defines a size of a piece of information that may be potentially hidden in a received data item.

In some cases the size of the first piece of information to be hidden in the new data item is larger than the size of a piece of information as defined by the number of the plurality of classes.

In some cases the method further comprises splitting (i) the received new data item into a plurality of sub data items, and (ii) the first piece of information to be hidden in the new data item into a plurality of sub pieces of information, wherein modifying the new data item to generate a modified data item comprises modifying each sub data item to generate a modified sub data item that, when processed by the neural network, is classified by the neural network as belonging to a class of the plurality of classes that is mapped to a respective sub piece of information in the maintained data.

In some implementations modifying each sub data item to generate a modified sub data item comprises modifying each sub data item using a respective adversarial example.

In some cases the neural network is configured to process data items of a particular input size, and wherein the size of each sub data item is smaller than the input size, and processing modified sub data items by the neural network comprises upscaling the sub data items to the input size.

In some implementations the size of each sub piece of information is equal to or less than the size of the piece of information as defined by the number of the plurality of classes.

In some implementations the method further comprises splitting (i) the received new data item into a plurality of sub data items, and (ii) the first piece of information to be hidden in the new data item into a plurality of sub pieces of information, wherein modifying the new data item to generate a modified data item comprises modifying each sub data item to generate a modified sub data item that, when processed by the neural network, is classified by the neural network as belonging to one or more classes of the plurality of classes that are mapped to respective sub pieces of information in the maintained data.

In some cases (i) the new data item comprises an image, (ii) the first piece of information to be hidden in the image comprises one or more bytes of information, and (iii) the neural network is configured to classify input images as belonging to one of a plurality of image classes.

In some implementations maintaining data mapping each of a plurality of classes to a respective piece of information that may potentially be hidden in a received data item comprises maintaining data mapping each of a plurality of image classes to a respective byte of information that may potentially be hidden in a received image, comprising: assigning a number (i) to each of the plurality of image classes, and (ii) to the one or bytes of information using an encoding scheme; and mapping each numbered character to a similarly numbered image class.

In some cases modifying the image to generate a modified image that is classified by the neural network as belonging to a first class of the plurality of classes that is mapped to a respective character in the maintained data comprises modifying the image to generate a modified image that is classified by the neural network as belonging to a numbered image class that is mapped to a similarly numbered character in the maintained data.

In general, another innovative aspect of the subject matter described in this specification can be embodied in methods for maintaining data mapping each of a plurality of classes to a respective piece of information that may potentially be hidden in a received data item; receiving a new data item; processing the new data item using a neural network, wherein the neural network has been configured through training to process the new data item and generate a neural network output classifying the new data item as belonging to a first class of the plurality of classes; and determining, from the neural network output and the maintained data, that a first piece of information that is mapped to the first class in the maintained data has been hidden in the received data item.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages.

A system hiding and detecting information using neural networks, as described in this specification, enables arbitrary content or information such as an image, video or audio signal to be efficiently embedded in a data item without being perceivable by a human. In addition, the embedded image or audio signal is robust to different transformations such as compression or forms of noise.

A system hiding and detecting information using neural networks, as described in this specification, avoids the need to perform hand tuned feature and encoding schemes and provides an automatic method for hiding information in data items and achieves high levels of computational efficiency. Furthermore, a system hiding information using neural networks may be applied to a variety of different signal types, e.g., image, video, speech or music.

A system hiding and detecting information using neural networks, as described in this specification, may reduce the amount of computational hardware needed for hiding and detecting information in data items since a same neural network, i.e., a neural network with the same architecture and network parameters, may be used to both encode information in a data item and decode the encoded information in the data item.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods for using a trained neural network to hide or detect information inside a data item such as an image, audio or video signal.

Figure 1A:
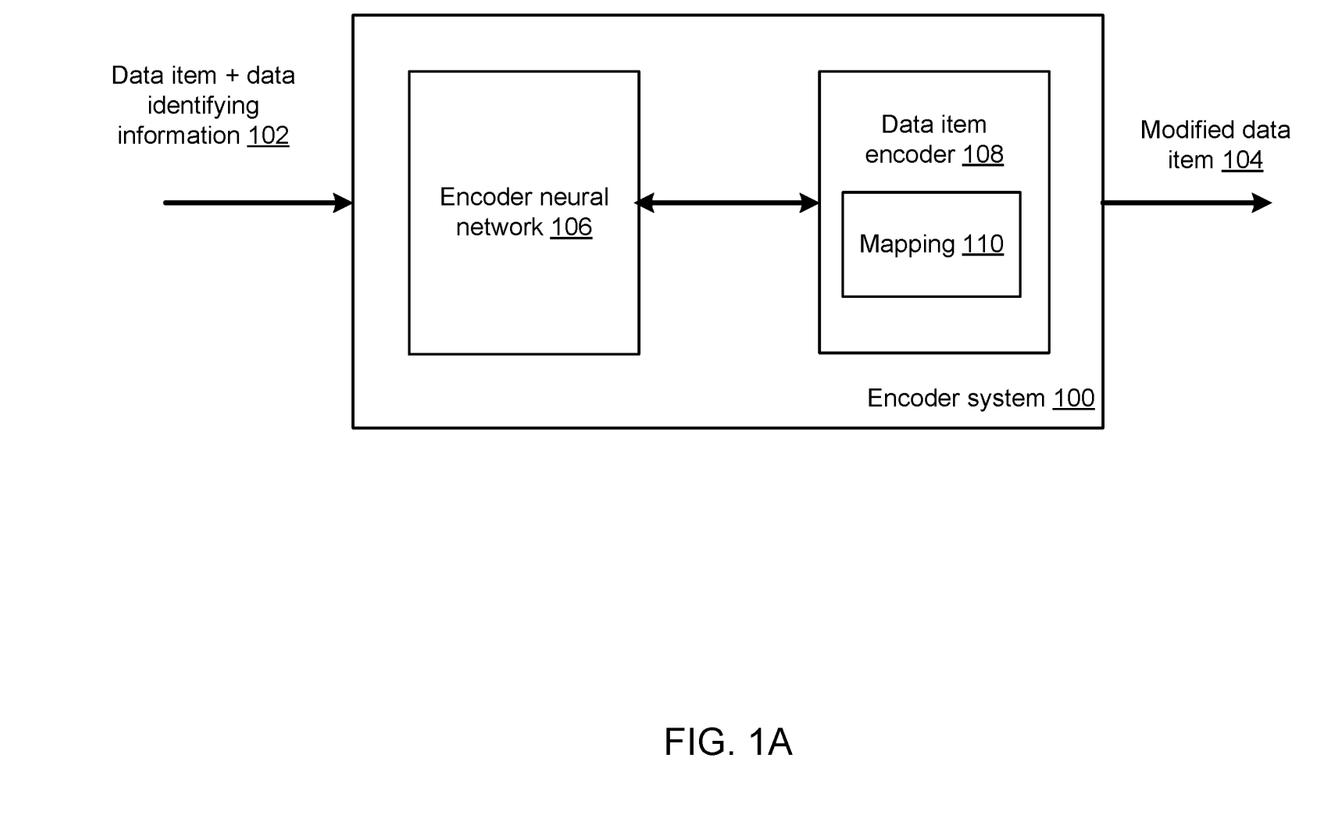
FIGS. 1A and 1B show example systems for hiding information in data items and detecting information that has been hidden in data items.

FIG. 1A shows an example encoder system 100 for hiding information in data items. The encoder system 100 is an example of a system implemented as computer programs on one or more computers in one or more locations, in which the systems, components, and techniques described below can be implemented.

The encoder system 100 is a system that receives a data item and data identifying information 102 to be hidden in the data item. The encoder system 100 generates as an output a modified data item 104 that hides the received information to be hidden in the data item. For example, a modified data item 104 may include a data item that has been modified to embed received information without modifying how the data item is perceived, e.g., by a human. In some cases the modified data item 104 hides the received information in such a way that prevents the information from being accessible to third parties. In some implementations the encoder system 100 may be a part of a steganographic system.

The encoder system includes a trained encoder neural network 106. The encoder neural network 106 is a neural network that has been trained for a given task, e.g., a classification task such as image classification, speech recognition, or music genre detection, on a corresponding set of training data. For example, the encoder neural network 106 may have been trained to receive a data item input and process the data item input to classify the data item input as belonging to one of multiple neural network classes. The encoder neural network 106 may be configured to process received data items, e.g., received data item 102, of a particular input size defined by the encoder neural network architecture. In some cases the size of a received data item may be smaller than the input size. In these cases the encoder neural network 106 may be configured to upscale the received data item to the input size.

The encoder neural network 106 may include multiple neural network layers. The type of neural network layers include in encoder neural network 106 is dependent on the task that the encoder neural network 106 has been trained on. For example, in some implementations the encoder neural network 106 may have been trained for image classification and one or more of the neural network layers may include convolutional neural network layers. As another example, in some implementations the encoder neural network 106 may have been trained for speech recognition and one or more of the neural network layers may include recurrent neural network layers.

In cases where the encoder neural network 106 has been trained for an image classification task the encoder neural network 106 may be configured to receive an input image and classify the image as belonging to one or more of multiple image classes. For example, the encoder neural network 106 may have been trained to classify an image as belonging to one or more of multiple image classes, e.g., image classes including natural objects such as "dog," "cat," "bird" or "tree." As another example, the encoder neural network 106 may have been trained for a speech recognition task and may be configured to receive an input snippet of audio and classify the input snippet of audio as belonging to one or more of multiple audio classes. For example, the encoder neural network 106 may have been trained to classify a snippet of audio as belonging to one or more of multiple phoneme classes, e.g., phoneme classes /a/, /b/, /c/.

In some implementations the encoder neural network 106 may have been trained for a regression task on a corresponding set of training data. For example, the encoder neural network 106 may be trained to process an input to generate real-valued outputs.

The encoder neural network 106 may have been trained, e.g., using gradient descent or other conventional neural network training techniques, on a corresponding set of training data that includes a large number of training examples to determine trained values of parameters that specify the encoder neural network 106. For example, the set of training data may include millions of training examples. The encoder neural network 106 may therefore have learned robust feature representations that enable the encoder neural network 106 to reliably classify or predict received data inputs, i.e., by virtue of processing inputs in accordance with the trained values of the parameters.

The encoder system 100 includes a data item encoder 108. The data item encoder 108 is configured to receive the data item and data identifying information 102 to be hidden in the data item and encode the information in the received data item. To encode the information in the received data item the data item encoder 108 maintains a mapping 110 that includes data mapping some or all of multiple classes to a respective piece of information that may potentially be hidden in a received data item. For example, as described above, the encoder neural network 106 may have been trained to receive a data item input and process the data item input to classify the data item input as belonging to one of multiple neural network classes. The mapping 110 may include data mapping some or all of the multiple neural network classes to a respective piece of information that may potentially be hidden in a received data item.

For example, the neural network classes may include image classes and information that may potentially be hidden in a received data item may include characters, sub images or arbitrary bytes of information. In these cases the mapping 110 may include data mapping some or all of the multiple image classes to a respective character or sub image that may potentially be hidden in a received data item.

The data item encoder 108 may be configured to maintain data mapping some or all of the multiple classes to a respective piece of information that may potentially be hidden in a received data item. For example, the data item encoder 108 may assign a distinct number to some or all of the multiple image classes. The data item encoder 108 may further assign a distinct number to different pieces of information that may potentially be hidden in a received data item. The data item encoder 108 may then map each numbered class to the piece of information having the same number as the class. Mapping classes to respective pieces of information is described in more detail below with reference to FIG. 2.

As described above, in some implementations the encoder neural network 106 may have been trained for a regression task on a corresponding set of training data and may process received inputs to generate real-valued outputs. In these cases, the data item encoder 108 may discretize the real valued outputs and assign a distinct number to intervals of the real valued outputs. For example, the interval [0, 0.25) may be assigned byte "0," and [0.25, 0.5) may be assigned byte "1." The data item encoder 108 may further assign a distinct number to different pieces of information that may potentially be hidden in a received data item and map each numbered real-valued interval to the piece of information having the same number.

The data item encoder 108 is configured to modify the received data item 102 to generate a modified data item 104 that, when processed by the encoder neural network 106, is classified by the encoder neural network 106 as belonging to a first class of the multiple neural network classes that is mapped to the first piece of information in the maintained data included in mapping 110. For example, the data item encoder 108 may be configured to generate a modified data item that maximizes a response of the encoder neural network 106 for the first class of the multiple classes that is mapped to the first piece of information in the maintained data.

In some implementations the data item encoder 108 may be configured to modify a received data item 102 to generate a modified data item 104 using an adversarial example, e.g., a neural network input formed by applying a perturbation to a dataset example such that the perturbed input results in the neural network outputting an incorrect answer with high confidence. For example, the data item encoder 108 may be in data communication with the encoder neural network 106 and may compute an adversarial example by backpropagating gradients through the encoder neural network 106 to maximize a response of the encoder neural network 106 to classify the received data item 102 as belonging to a first class of the multiple classes that is mapped to the received information in the maintained data mapping 110. The data item encoder 108 may then modify the received data item 102 to generate a modified data item 104 using the backpropagated gradients. In some implementations a prior may be imposed in order to ensure that changes to the received data item 102 are as small as possible. Modifying inputs to neural networks using adversarial examples is described in more detail in "Explaining and harnessing adversarial examples," Ian Goodfellow, Jonathan Shlens and Christian Szegedy, arXiv.org, identifier 1412.6572.

For example, the encoder system 100 may receive a data item 102 that includes an image, e.g., an image of a tree, and data identifying information 102 that includes the character "s" that is to be hidden in the image. The data item encoder 108 may determine from the maintained data mapping 110 that the character "s" is mapped to a first class in the multiple neural network classes that represents the object "horse." The data item encoder 108 may then modify the received image of the tree to generate a modified image that may be classified by the encoder neural network 106 as belonging to the image class representing the object "horse." In some implementations the difference between the received data item 102 and the modified data item 104 may not be perceivable to the human eye, e.g., the modified image that may be classified by the encoder neural network 106 as belonging to the image class representing a horse may not be perceived as an image representing a horse, but rather an image representing a tree.

In some implementations, e.g., when the size of information that is to be hidden in a data item is larger than a predetermined threshold, the data item encoder 108 may be further configured to receive a data item and data identifying information 102 and split the received data item into multiple sub data items and the information to be hidden in the data item into multiple sub pieces of information. In these cases, the data item encoder 108 may modify each sub data item to generate a modified sub data item that, when processed by the encoder neural network 106, is classified by the encoder neural network 106 as belonging to a class of the multiple neural network classes that is mapped to a respective sub piece of information in the maintained data. The data item encoder 108 may modify each sub data item to generate a modified sub data item using the techniques described above, e.g., using a respective adversarial example.

In some implementations the data item encoder 108 may be configured to modify the received data item 102 to generate a modified data item 104 that, when processed by the encoder neural network 106, is classified by the encoder neural network 106 as belonging to a multiple classes of the multiple neural network classes. For example, the encoder neural network 106 may process the modified data item 104 and generate multiple scores that represent a probability that the data item 102 belongs to multiple respective classes, e.g., multiple scores that exceed a predetermined threshold. As another example, the encoder neural network 106 may process the modified data item 104 and generate as output a probability distribution with N top scoring outputs that represent probabilities that the data item belongs to N respective classes.

The encoder system 100 provides the modified data item 104, or modified sub data items as described above, as output. Generating a modified data item including received information hidden in a received data item is described in more detail below with reference to FIG. 2.

Figure 1B:
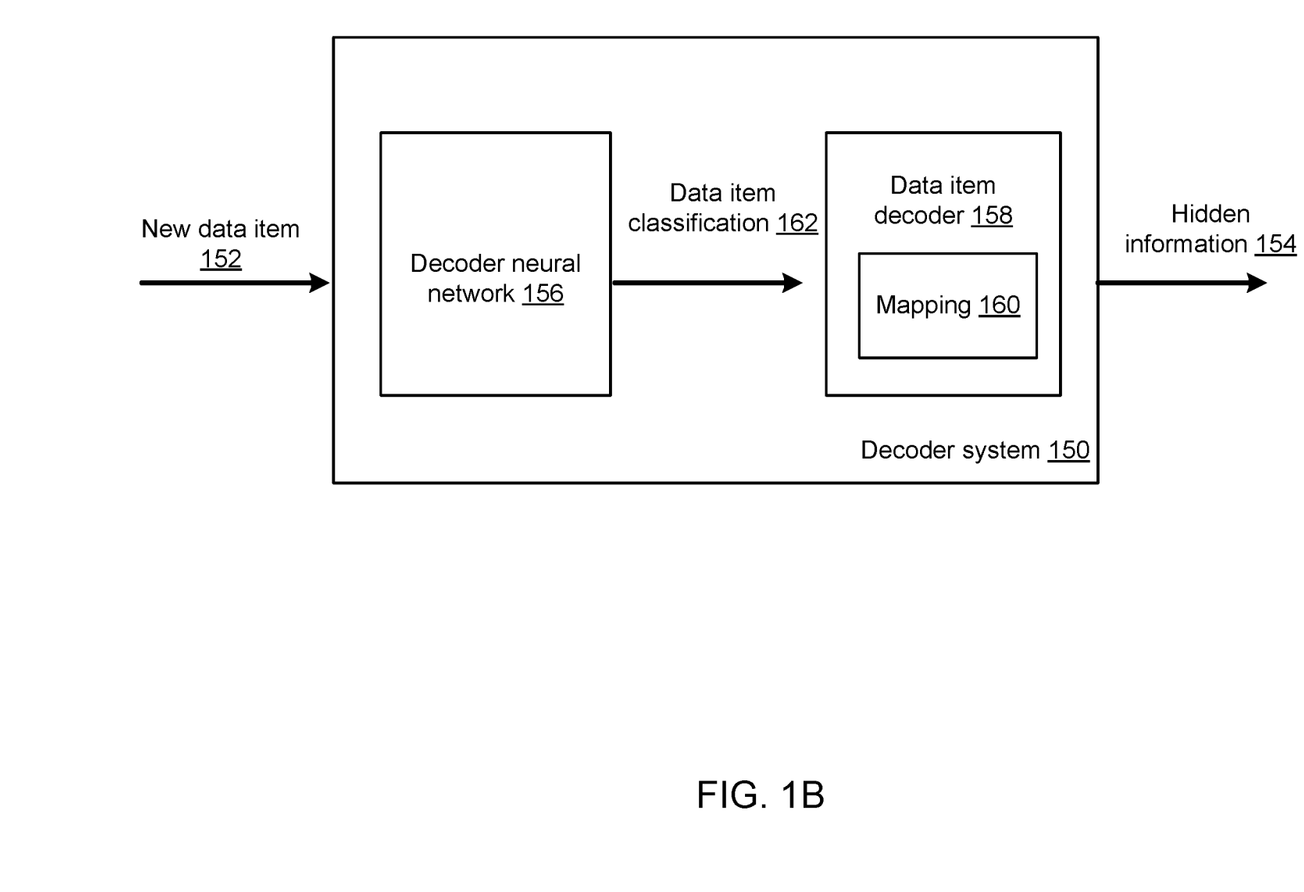

FIG. 1B shows an example decoder system 150 for detecting information that has been hidden in data items. The decoder system 150 is an example of a system implemented as computer programs on one or more computers in one or more locations, in which the systems, components, and techniques described below can be implemented.

The decoder system 150 is a system that receives a new data item 152 and identifies hidden information 154 in the received new data item 152. The new data item 152 may correspond to a modified data item, e.g., modified data item 104 as described above with reference to FIG. 1A.

The decoder system 152 includes a trained decoder neural network 156. The decoder neural network 156 is a neural network that may receive a new data item input, e.g., new data item 152, and process the received new data item input to generate a data item classification as output, e.g., data item classification 162. For example, the decoder neural network 156 may process a received new data item 152 and generate one or more scores that represent a probability that the data item 152 belongs to one or more respective classes. A corresponding data item classification 162 may be generated by selecting a classification that corresponds to a highest scoring class.

The decoder neural network 156 may have been trained for a given task, e.g., a classification task such as image classification, speech recognition, or music genre detection, on a corresponding set of training data. For example, the decoder neural network 156 may have been trained to receive a new data item input, e.g., data item 152, and process the new data item input to classify the data item input as belonging to one of multiple neural network classes.

The decoder neural network 156 may include multiple neural network layers. The type of neural network layers include in decoder neural network 156 is dependent on the task that the decoder neural network 156 has been trained on. For example, in some implementations the decoder neural network 156 may have been trained for image classification and one or more of the neural network layers may include convolutional neural network layers. As another example, in some implementations the decoder neural network 156 may have been trained for speech recognition and one or more of the neural network layers may include recurrent neural network layers.

In cases where the decoder neural network 156 has been trained for an image classification task the decoder neural network 156 may be configured to receive an input image and classify the image as belonging to one or more of multiple image classes. For example, the decoder neural network 156 may have been trained to classify an image as belonging to one or more of multiple image classes, e.g., image classes including natural objects such as "dog," "cat," "bird" or "tree." As another example, the decoder neural network 156 may have been trained for a speech recognition task and may be configured to receive an input snippet of audio and classify the input snippet of audio as belonging to one or more of multiple audio classes. For example, the decoder neural network 156 may have been trained to classify a snippet of audio as belonging to one or more of multiple phoneme classes, e.g., phoneme classes /a/, /b/, /c/.

In some implementations the decoder neural network 156 may have been trained for a regression task on a corresponding set of training data.

The decoder neural network 156 may have been trained, e.g., using gradient descent or other conventional neural network training techniques, on a corresponding set of training data that includes a large number of training examples to determine trained values of parameters that specify the decoder neural network 156. For example, the set of training data may include millions of training examples. The decoder neural network 156 may therefore have learned robust feature representations that enable the decoder neural network 156 to reliably classify or predict received data inputs, i.e., by virtue of processing inputs in accordance with the trained values of the parameters.

In some implementations the encoder neural network 106 of FIG. 1A and the decoder neural network 156 may be different instances of the same neural network, e.g., a neural network with a same architecture and same trained values of neural network parameters.

The decoder system 156 includes a data item decoder 158. The data item decoder 158 is configured to receive a data item classification, e.g., data item classification 162, and determine a piece of information that has been hidden in the data item corresponding to the data item classification, e.g., data item 152. In order to determine a piece of information that has been hidden in a data item, the data item decoder 158 maintains a mapping 160 that includes data mapping some or all of multiple classes to a respective piece of information that may potentially be hidden in a received data item. For example, as described above, the decoder neural network 156 may have been trained to receive a new data item input and process the data item input to classify the data item input as belonging to one of multiple neural network classes. The mapping 160 may include data mapping some or all of the multiple neural network classes to a respective piece of information that may potentially be hidden in a received data item.

For example, the neural network classes may include image classes and information that may potentially be hidden in a received data item may include characters or sub images. In these cases the mapping 160 may include data mapping some or all of the multiple image classes to a respective character or sub image that may potentially be hidden in a received data item.

The data item decoder 168 may be configured to maintain data mapping some or all of the multiple classes to a respective piece of information that may potentially be hidden in a received data item. For example, the data item encoder 168 may assign a distinct number to some or all of the multiple image classes. The data item encoder 168 may further assign a distinct number to different pieces of information that may potentially be hidden in a received data item. The data item encoder 168 may then map each numbered class to the piece of information that was assigned the same number as the class. In some implementations the mapping 110 of FIG. 1A and mapping 160 may be a same mapping, e.g., the mappings 110 and 160 contain the same data mapping some or all of multiple classes to respective pieces of information that may potentially be hidden in a received data item.

The data item decoder 158 may use the maintained data in mapping 160 to determine a piece of information that is mapped to a first class in the maintained data and that has been hidden in a received new data item. For example, the decoder system 150 may receive a new data item 152, e.g., an image, and process the new data item 152 using the decoder neural network 156 to determine a corresponding data item classification 162, e.g., a data item classification that classifies the received image as representing a horse. The data item decoder 158 may determine from the maintained data mapping 160 that the data item classification "horse" is mapped to a character "s," and may provide the character "s" as output. In some implementations the received new data item 152 may include a modified data item, e.g., modified data item 104 of FIG. 1A, and the data item classification 162 may not visibly or audibly match the received data item. For example, the received new data item may include an image that to the human eye represents a first object, such as a tree, whereas the new data item classification as output by the decoder neural network 156 may indicate that the received data item represents a second object, such as a horse.

In some implementations the data item decoder 158 may determine multiple pieces of information that are mapped to multiple respective classes in the maintained data and have been hidden in a received data item. For example, the decoder system 150 may receive a new data item 152 and process the new data item 152 using the decoder neural network 156 to determine multiple data item classifications. For example, the decoder neural network 156 may process a received new data item 152 and generate one or more scores that represent a probability that the data item 152 belongs to one or more respective classes. The decoder system 150 may then determine N data item classifications by selecting N classifications corresponding to the N highest scoring classes. In some implementations the decoder system 150 may select a predetermined number of highest scoring classes. In other implementations the decoder system 150 may select multiple classes that correspond to classes whose respective scores exceed a predetermined threshold, e.g., one or more classes whose scores exceed 0.4.

The data item decoder 158 may then determine from the maintained data in mapping 160 that the multiple data item classifications are mapped to multiple pieces of information, and provide the multiple pieces of information as output 154. In some implementations the data item decoder 158 may read the multiple pieces of information in order of confidence score, e.g., beginning with a piece of information whose respective score is a highest score. Detecting information in a data item is described in more detail below with reference to FIG. 3.

Figure 2:
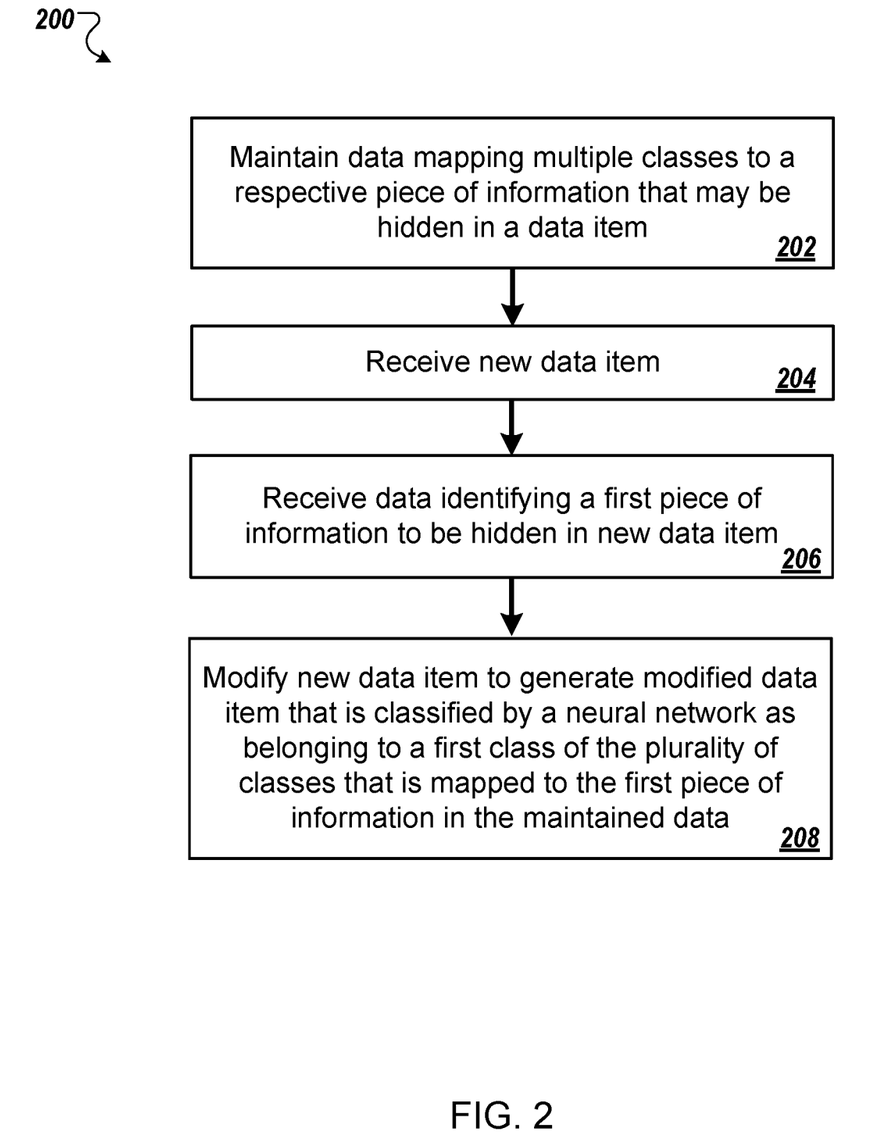
FIG. 2 is a flow diagram of an example process for hiding information in data items.

FIG. 2 is a flow diagram of an example process 200 for hiding information in a data item. For convenience, the process 200 will be described as being performed by a system of one or more computers located in one or more locations. For example, an encoder system configured to hide information in data items, e.g., the encoder system 100 of FIG. 1A, appropriately programmed in accordance with this specification, can perform the process 200.

The system maintains data mapping some or all of multiple classes to a respective piece of information that may potentially be hidden in a received data item (step 202). For example, the multiple classes may include multiple classes representing images, e.g., natural object classes such as dog, cat, bird or car. In such cases, a piece of information that may potentially be hidden in a received data item may include one or more characters, one or more sub images or any arbitrary bytes of information. In other examples, the multiple classes may include multiple classes representing phonemes, e.g., /a/, /b/ or/c/. In such cases, a piece of information that may potentially be hidden in a received data item may include one or more spoken sounds or words.

In some implementations the number of the multiple classes defines a size of a piece of information that may potentially be hidden in a received data item. For example, if the multiple classes includes 1024 classes, the system may reliably encode $10=\ln_2(1024)$ bits of information in a received data item.

The system may maintain data mapping some or all of the multiple classes to a respective piece of information that may potentially be hidden in a received data item by assigning a number to some or all of the multiple image classes and assigning a number to pieces of information that may potentially be hidden in a received data item. The system may then map each numbered class to a similarly numbered piece of information. For example, as described above, the multiple classes may include multiple classes representing images and pieces of information that may potentially be hidden in a received data item may include one or more bytes of information, e.g., one or more characters. In these cases the system may maintain data mapping some or all of the multiple images classes to a respective byte of information, e.g., character, that may potentially be hidden in a received image by assigning a number (i) to some or all of the multiple image classes, and (ii) to the one or more bytes of information using an encoding scheme, e.g., a character encoding scheme. The system may then map each numbered byte to a similarly numbered image class.

For example, an image class representing the object "dog" may be assigned the number 77. Using a character encoding scheme, e.g., the American Standard Code for Information Exchange (ASCII), the character "M" may also be assigned the number 77. The system may then map the character "M" to the image class "dog". Similarly, an image class representing the object "horse" may be assigned the number 83. Using the character encoding scheme the character "S" may also be assigned the number 83. The system may then map the character "S" to the image class "horse."

The system receives a new data item (step 204). For example, the new data item may include an image, e.g., a photograph of size 1920×1080.

The system receives data identifying a first piece of information to be hidden in the new data item (step 206). For example, the first piece of information to be hidden in the new data item, e.g., an image, may include one of multiple characters.

In some implementations the size of the first piece of information to be hidden in the new data item may be larger than the size of a piece of information as defined by the number of the multiple classes. For example, as described above, the multiple classes may include 1000 classes whereas the size of the first piece of information to be hidden in the new data item may include 320 bits of information. In such cases, the system may split the received new data item into multiple sub data items, e.g., split the photograph of size 1920×1080 into 32 sub images of size 224×224. The system may further split the first piece of information to be hidden in the new data item into multiple sub pieces of information, e.g., with each sub piece of information corresponding to a respective sub data item. The size of each sub piece of information may be equal to or less than the size of the piece of information as defined by the number of the multiple classes.

The system modifies the new data item to generate a modified data item that, when processed by a neural network configured to classify input data items, is classified by the neural network as belonging to a first class of the multiple classes that is mapped to the first piece of information in the maintained data (step 208). For example, the system may generate a modified data item that maximizes a response of the neural network for the first class of the multiple classes that is mapped to the first piece of information in the maintained data.

In some implementations, as described above, the new data item may include an image and the first piece of information to be hidden in the image may include a character. In such cases the neural network may be configured to classify input images as belonging to one or more image classes, e.g., multiple classes representing images as described above with reference to step 202. The system may modify the received image to generate a modified image that may be classified by the neural network as belonging to a first image class of the multiple image classes that is mapped to a respective character in the maintained data, e.g., a numbered image class that is mapped to a similarly numbered character in the maintained data.

For example, the system may receive a new data item that includes an image, e.g., an image of a tree, and data identifying the character "S" that is to be hidden in the image. The system may determine from the maintained data that the character "S" is mapped to a first image class in the multiple image classes that represents the object "horse." The system may then modify the received image of the tree to generate a modified image that may be classified by the neural network as belonging to the image class representing the object "horse." In some implementations the difference between the received data item and the modified data item may not be perceivable to the human eye, e.g., the modified image that may be classified by the neural network as belonging to the image class representing a horse may not be perceived as an image representing a horse, but rather an image representing a tree. The modified data item may be robust to different transformations, e.g., image compression.

In some implementations the system may modify the new data item to generate a modified data item by modifying the new data item using an adversarial example, e.g., a neural network input formed by applying a perturbation to a dataset example such that the perturbed input results in the neural network outputting an incorrect answer with high confidence. For example, the system may backpropagate gradients to maximize a response of the neural network to classify the new data item as belonging to the first class of the multiple classes that is mapped to the first piece of information in the maintained data and modify the new data item to generate a modified data item using the backpropagated gradients.

As described above with reference to step (206), in some cases the size of the first piece of information to be hidden in the new data item is larger than the size of a piece of information as defined by the number of the multiple classes and the system may split the received new data item into multiple sub data items and split the first piece of information to be hidden in the new data item into multiple sub pieces of information. In these cases, the system may modify the new data item to generate a modified data item by modifying each sub data item to generate a modified sub data item that, when processed by the neural network, is classified by the neural network as belonging to a class of the multiple classes that is mapped to a respective sub piece of information in the maintained data. The system may modify each sub data item to generate a modified sub data item using the techniques described above, e.g., using a respective adversarial example.

In some implementations the neural network is configured to process data items of a particular input size and the size of each sub data item equals the input size. In other implementations the neural network is configured to process data items of a particular input size and the size of each sub data item is smaller than the input size. In these cases processing modified sub data items by the neural network may include upscaling the sub data items to the input size. In some implementations the system may increase the amount of information that may be reliably encoded in a received data item by splitting the received data item into smaller sub data items and upscaling the sub data items to the input size. The amount of information encoded in a received data item may also be increased by using a neural network with a small input size, e.g., input images of size 64×64.

In some cases the system may modify the new data item to generate a modified data item by modifying each sub data item to generate a modified sub data item that, when processed by the neural network, is classified by the neural network as belonging to one or more classes of the multiple classes that are mapped to respective sub pieces of information in the maintained data. Generating a modified sub data item that is classified by the neural network as belonging to multiple classes of the multiple classes that are mapped to respective sub pieces of information in the maintained data may enable the system to encode more information in a received image. For example, continuing the example described above with reference to step 202, by generating a modified sub data item that is classified as belonging to 3 classes of the multiple classes, e.g., as indicated by scores output by the neural network, the system may reliably encode 3×10=30 bits of information in the sub data item.

Figure 3:
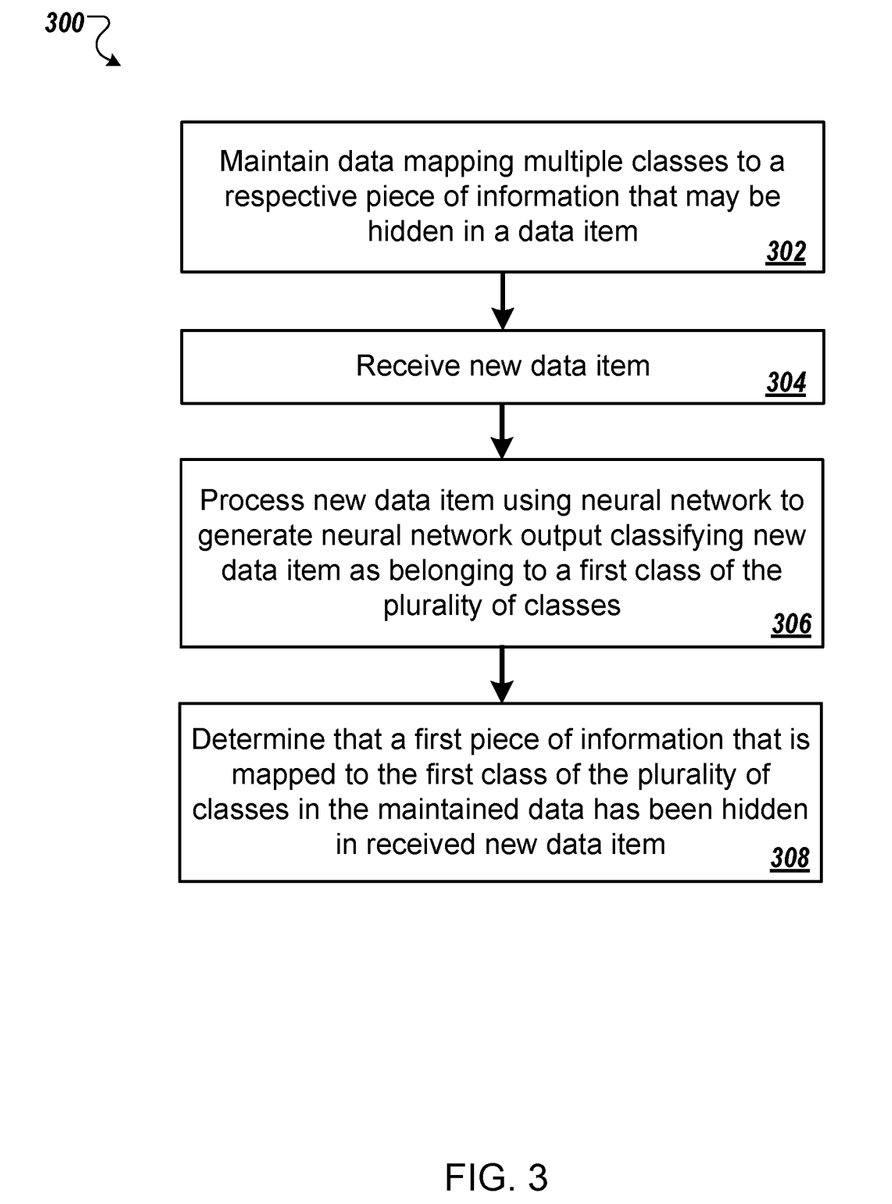
FIG. 3 is a flow diagram of an example process for detecting information that has been hidden in data items.

FIG. 3 is a flow diagram of an example process 300 for detecting information that has been hidden in a data item. For convenience, the process 300 will be described as being performed by a system of one or more computers located in one or more locations. For example, a decoder system configured to detect information in data items, e.g., the decoder system 150 of FIG. 1B, appropriately programmed in accordance with this specification, can perform the process 300.

The system maintains data mapping some or all of multiple classes to a respective piece of information that may potentially be hidden in a received data item (step 302). For example, the multiple classes may include multiple classes representing images, e.g., natural objects such as dog, cat, bird or car. In such cases, a piece of information that may potentially be hidden in a received data item may include one or more bytes that can correspond to one or more characters, one or more sub images or any other form of content. In other examples, the multiple classes may include multiple classes representing phonemes, e.g., /a/, /b/ or /c/. In such cases, a piece of information that may potentially be hidden in a received data item may include one or more spoken sounds or words.

The system may maintain data mapping some or all of the classes to a respective piece of information that may potentially be hidden in a received data item by assigning a number to some or all of the multiple classes and assigning a number to pieces of information that may potentially be hidden in a received data item. The system may then map each numbered class to a similarly numbered piece of information. For example, as described above, the multiple classes may include multiple classes representing images and pieces of information that may potentially be hidden in a received data item may include one or more characters. In these cases the system may maintain data mapping some or all of the multiple image classes to a respective character that may potentially be hidden in a received image by assigning a number (i) to some or all of the multiple image classes, and (ii) to the one or more characters using a character encoding scheme. The system may then map each numbered character to a similarly numbered image class.

For example, an image class representing the object "dog" may be assigned the number 77. Using a character encoding scheme, e.g., the American Standard Code for Information Exchange (ASCII), the character "m" may also be assigned the number 77. The system may then map the character "m" to the image class "dog". Similarly, an image class representing the object "horse" may be assigned the number 83. Using the character encoding scheme the character "S" may also be assigned the number 83. The system may then map the character "S" to the image class "horse."

The system receives a new data item (step 304). For example, the new data item may include an image, e.g., an image of a tree as perceivable to the human eye.

The system processes the new data item using a neural network, where the neural network has been configured through training to process the new data item and generate a neural network output classifying the new data item as belonging to one or more classes of multiple classes, e.g., a first class of the multiple classes (step 306). For example, the system may process a received image, e.g., an image of a tree as perceivable to the human eye, using a neural network that has been configured through training to process images and generate a respective neural network output that classifies the image as belonging to one or more of multiple image classes, e.g., an output classifying the received image of a tree as perceivable to the human eye as representing a horse.

In some implementations the system may generate a neural network output classifying a received data item as belonging to multiple classes of the multiple classes. For example, the system may process a received image, e.g., an image of a tree as perceivable to the human eye, using the neural network to generate an output classifying the received image as belonging to multiple classes, e.g., an output classifying the received image of a tree as perceivable to the human eye as representing a horse, car or bench. For example, the neural network may process a new data item and generate one or more scores that represent a probability that the data item belongs to one or more respective classes. The system may then determine N data item classifications by selecting N classifications corresponding to the N highest scoring classes. In some implementations the system may select a predetermined number of highest scoring classes, e.g., 3 highest scoring classes. In other implementations the decoder system 150 may select multiple classes that correspond to classes whose respective scores exceed a predetermined threshold, e.g., one or more classes whose scores exceed 0.3.

The system determines from the neural network output and the maintained data that a first piece of information that is mapped to the first class in the maintained data has been hidden in the received data item (step 308). For example, the system may determine from the maintained data that the class representing the object "horse" has been assigned the number 83, and that the number 83 has been mapped to the character "S" in the maintained data. The system may therefore determine that the character "S" has been hidden in the received image.

In some implementations the system may determine from the neural network output and the maintained data that multiple pieces of information that are mapped to respective classes in the maintained data have been hidden in the received data item. For example, the system may determine from the maintained data that the classes representing the object "horse", "car" and "bench" have been assigned respective numbers 83, 33 and 97, and that the numbers 83, 21 and 97 have been mapped to the characters "S", "!" and "a" in the maintained data. The system may therefore determine that the characters "S", "!" and "a" have been hidden in the received image. In some implementations the system may determine that multiple pieces of information has been hidden in the received data item by identifying information in metadata associated with the received item. For example, the system may receive a data item for processing that includes metadata instructing the system to split the received data item into one or more blocks of a particular size.

In some implementations steps 304-308 may be repeated for a sequence of received data items. For example, during the encoding process as described above with reference to FIG. 2, a size of a piece of information to be hidden in a data item may be larger than a size of a piece of information that may be reliably encoded in the data item, e.g., as defined by the number of the multiple classes. During the encoding process the encoding system may therefore split a received data item into a multiple sub data items and split the piece of information to be hidden in the data item into multiple sub pieces of information. The encoding system may then modify each sub data item to generate a modified sub data item that, when processed by the neural network, is classified by the neural network as belonging to a class of the multiple classes that is mapped to a respective sub piece of information in the maintained data. In these cases, the system may repeat steps 304-308 for each received sub data item to determine from a respective neural network output and the maintained data that a sub piece of information that is mapped to a respective class in the maintained data has been hidden in a respective sub data item. The system may then determine from the respective neural network outputs and the maintained data that the larger piece of information was hidden in a data item, e.g., by joining the determined sub pieces of information together to form the larger piece of information. In some implementations joining determined sub pieces of information together to form a larger piece of information may be performed across time, e.g., across frames in a video or audio signal.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., as a result of the user interaction, can be received from the user device at the server.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    maintaining data specifying a neural network configured to process input data items to classify each input data item as belonging to one of a plurality of classes;
    maintaining data mapping each of the plurality of classes to a respective piece of information;
    receiving a new data item;
    receiving data identifying a first piece of information to be hidden in the new data item;
    identifying a first class that maps to the first piece of information in the maintained data, wherein the first class is different from the first piece of information; and
    modifying the new data item to generate a modified data item that, when processed by the neural network, is classified by the neural network as belonging to the first class,
    wherein (i) the new data item comprises an image, (ii) the first piece of information to be hidden in the image comprises one or more bytes of information, and (iii) the neural network is configured to classify input images as belonging to one of a plurality of image classes, and
    wherein the image classes comprise types of natural objects, and the bytes of information comprise one or more of a character or a sub image.

2. The method of claim 1, wherein modifying the new data item to generate a modified data item comprises modifying the new data item using an adversarial example.

3. The method of claim 2, wherein modifying the new data item using an adversarial example comprises:
    backpropagating gradients to maximize a response of the neural network to classify the new data item as belonging to the first class; and
    modifying the new data item using the backpropagated gradients.

4. The method of claim 1, wherein maintaining data mapping each of the plurality of classes to a respective piece of information comprises:
    assigning a number (i) to each of the plurality of classes, and (ii) to each piece of information; and
    mapping each numbered class to an identically numbered piece of information.

5. The method of claim 1, further comprising:
    defining a size of a piece of information that can be hidden in a received data item according to the number of the plurality of classes.

6. The method of claim 5, wherein the a of the first piece of information to be hidden in the new data item is larger than the size of a piece of information that can be hidden in a received data item as defined according to the number of the plurality of classes.

7. The method of claim 6, wherein:
    the method further comprises splitting (i) the received new data item into a plurality of sub data items, and (ii) the first piece of information to be hidden in the new data item into a plurality of sub pieces of information, and
    identifying a first class that maps to the first piece of information in the maintained data comprises identifying a respective first class for each of the plurality of sub pieces of information, wherein each respective first class is different from the sub piece of information,
    wherein modifying the new data item to generate a modified data item comprises modifying each sub data item to generate a modified sub data item that, when processed by the neural network, is classified by the neural network as belonging to the respective first class.

8. The method of claim 7, wherein modifying each sub data item to generate a modified sub data item comprises modifying each sub data item using a respective adversarial example.

9. The method of claim 7, wherein the neural network is configured to process data items of a particular input size, and wherein the size of each sub data item is smaller than the input size, and
    wherein processing modified sub data items by the neural network comprises upscaling the sub data items to the input size.

10. The method of claim 7, wherein the size of each sub piece of information is equal to or less than the size of a piece of information that can be hidden in a received data item as defined by the number of the plurality of classes.

11. A computer-implemented method comprising:
    maintaining data specifying a neural network configured to process input data items to classify each input data item as belonging to one of a plurality of classes;
    maintaining data mapping each of the plurality of classes to a respective piece of information;
    receiving a new data item;
    processing the new data item using the neural network to generate a neural network output classifying the new data item as belonging to a first class of the plurality of classes; and determining, from the neural network output and the maintained data, that a first piece of information that is mapped to the first class in the maintained data has been hidden in the received data item, wherein the first piece of information is different from the first class, wherein maintaining data mapping each of a plurality of classes to a respective piece of information comprises: assigning a number (i) to each of the plurality of classes, and (ii) to each piece of information; and mapping each numbered class to an identically numbered piece of information, wherein (i) the new data item comprises an image, (ii) the neural network has been configured through training to process the image and generate a neural network output classifying the image as belonging to a first image class of a plurality of image classes, and (iii) the first piece of information comprises one or more bytes of information, and wherein the image classes comprise types of natural objects and the bytes of information comprise one or more of a character or a sub image.

12. A system comprising one or more computers and one or more storage devices storing instructions that are operable, when executed by the one or more computers, to cause the one or more computers to perform a method for hiding information in a data item, the method comprising:

maintaining data specifying a first neural network configured to process input data items to classify each input data item as belonging to one of a plurality of classes;

maintaining data mapping each of the plurality of classes to a respective piece of information;

receiving a new data item;

receiving data identifying a first piece of information to be hidden in the new data item;

identifying a first class that maps to the first piece of information in the maintained data, wherein the first class is different from the first piece of information; and modifying the new data item to generate a modified data item that, when processed by the first neural network, is classified by the first neural network as belonging to the first class, wherein (i) the new data item comprises an image, (ii) the first piece of information to be hidden in the image comprises one or more bytes of information, and (iii) the first neural network is configured to classify input images as belonging to one of a plurality of image classes, and wherein the image classes comprise types of natural objects and the bytes of information comprise one or more of a character or a sub image.

13. The system of claim 12, wherein the one or more computers and one or more storage devices storing instructions are further operable, when executed by the one or more computers, to cause the one or more computers to perform a method for detecting information in a data item, the method comprising:

maintaining data specifying a second neural network configured to process input data items to classify each input data item as belonging to one of a plurality of second classes;

maintaining data mapping each of the plurality of second classes to a respective piece of information;

receiving a second new data item;

processing the second new data item using the second neural network to generate a second neural network output classifying the second new data item as belonging to a particular second class of the plurality of second classes; and determining, from the second neural network output and the maintained data, that a second piece of information that is mapped to the particular second class in the maintained data has been hidden in the received second data item, wherein the second piece of information is different from the particular second class, wherein maintaining data mapping each of a plurality of second classes to a respective piece of information comprises:

assigning a number (i) to each of the plurality of second classes, and (ii) to each piece of information; and mapping each numbered second class to an identically numbered piece of information, wherein (i) the second new data item comprises a second image, (ii) the second neural network has been configured through training to process the second image and generate a second neural network output classifying the second image as belonging to a particular second image class of a plurality of second image classes, and (iii) the second piece of information comprises one or more second bytes of information, and wherein the second image classes comprise types of natural objects and the second bytes of information comprise one or more of a character or a sub image.

14. The system of claim 13, wherein the first neural network and second neural network are the same neural network.

15. A computer-implemented method comprising:

maintaining data specifying a neural network configured to process input data items to classify each input data item as belonging to one of a plurality of classes;

maintaining data mapping each of the plurality of classes to a respective piece of information;

receiving a new data item;

receiving data identifying a first piece of information to be hidden in the new data item;

identifying a first class that maps to the first piece of information in the maintained data, wherein the first class is different from the first piece of information; and modifying the new data item to generate a modified data item that, when processed by the neural network, is classified by the neural network as belonging to the first class, wherein the new data item comprises an audio sample, the first piece of information to be hidden in the audio sample comprises one or more spoken sounds or words, and the neural network is configured to classify input audio samples as belonging to one of a plurality of classes representing phonemes.

16. The method of claim 15, wherein modifying the new data item to generate a modified data item comprises modifying the new data item using an adversarial example.

17. The method of claim 16, wherein modifying the new data item using an adversarial example comprises:

backpropagating gradients to maximize a response of the neural network to classify the new data item as belonging to the first class; and modifying the new data item using the backpropagated gradients.

18. The method of claim 15, wherein maintaining data mapping each of the plurality of classes to a respective piece of information comprises:

assigning a number (i) to each of the plurality of classes, and (ii) to each piece of information; and mapping each numbered class to an identically numbered piece of information.

19. The method of claim 15, further comprising:
defining a size of a piece of information that can be hidden in a received data item according to the number of the plurality of classes.

20. The method of claim 19, wherein the a of the first piece of information to be hidden in the new data item is larger than the size of a piece of information that can be hidden in a received data item as defined according to the number of the plurality of classes.

21. The method of claim 20, wherein:
the method further comprises splitting (i) the received new data item into a plurality of sub data items, and (ii) the first piece of information to be hidden in the new data item into a plurality of sub pieces of information, and
identifying a first class that maps to the first piece of information in the maintained data comprises identifying a respective first class for each of the plurality of sub pieces of information, wherein each respective first class is different from the sub piece of information,
wherein modifying the new data item to generate a modified data item comprises modifying each sub data item to generate a modified sub data item that, when processed by the neural network, is classified by the neural network as belonging to the respective first class.

22. The method of claim 21, wherein modifying each sub data item to generate a modified sub data item comprises modifying each sub data item using a respective adversarial example.

23. The method of claim 21, wherein the neural network is configured to process data items of a particular input size, and wherein the size of each sub data item is smaller than the input size, and
wherein processing modified sub data items by the neural network comprises upscaling the sub data items to the input size.

24. The method of claim 21, wherein the size of each sub piece of information is equal to or less than the size of a piece of information that can be hidden in a received data item as defined by the number of the plurality of classes.

25. A computer-implemented method comprising:
maintaining data specifying a neural network configured to process input data items to classify each input data item as belonging to one of a plurality of classes;
maintaining data mapping each of the plurality of classes to a respective piece of information;
receiving a new data item;
processing the new data item using the neural network to generate a neural network output classifying the new data item as belonging to a first class of the plurality of classes; and
determining, from the neural network output and the maintained data, that a first piece of information that is mapped to the first class in the maintained data has been hidden in the received data item, wherein the first piece of information is different from the first class,
wherein the new data item comprises an audio sample, the first piece of information hidden in the received audio sample comprises one or more spoken sounds or words, and the neural network is configured to classify input audio samples as belonging to one of a plurality of classes representing phonemes.

26. A system comprising one or more computers and one or more storage devices storing instructions that are operable, when executed by the one or more computers, to cause the one or more computers to perform a method for hiding information in a data item, the method comprising:
maintaining data specifying a first neural network configured to process input data items to classify each input data item as belonging to one of a plurality of classes;
maintaining data mapping each of the plurality of classes to a respective piece of information;
receiving a new data item;
receiving data identifying a first piece of information to be hidden in the new data item;
identifying a first class that maps to the first piece of information in the maintained data, wherein the first class is different from the first piece of information; and
modifying the new data item to generate a modified data item that, when processed by the first neural network, is classified by the first neural network as belonging to the first class,
wherein the new data item comprises an audio sample, the first piece of information hidden in the received audio sample comprises one or more spoken sounds or words, and the first neural network is configured to classify input audio samples as belonging to one of a plurality of classes representing phonemes.

27. The system of claim 26, wherein the one or more computers and one or more storage devices storing instructions are further operable, when executed by the one or more computers, to cause the one or more computers to perform a method for detecting information in a data item, the method comprising:
maintaining data specifying a second neural network configured to process input data items to classify each input data item as belonging to one of a plurality of second classes;
maintaining data mapping each of the plurality of second classes to a respective piece of information;
receiving a second new data item;
processing the second new data item using the second neural network to generate a second neural network output classifying the second new data item as belonging to a particular second class of the plurality of second classes; and
determining, from the second neural network output and the maintained data, that a second piece of information that is mapped to the particular second class in the maintained data has been hidden in the received second data item, wherein the second piece of information is different from the particular second class
wherein the second new data item comprises a second audio sample, the second piece of information hidden in the second audio sample comprises one or more spoken sounds or words, and the second neural network is configured to classify input audio samples as belonging to one of a plurality of second classes representing phonemes.

28. The system of claim 13, wherein the first neural network and second neural network are the same neural network.

* * * * *

UNITED STATES PATENT AND TRADEMARK OFFICE
CERTIFICATE OF CORRECTION

| | | |
|---|---|---|
| PATENT NO. | : 10,755,171 B1 | Page 1 of 1 |
| APPLICATION NO. | : 15/203676 | |
| DATED | : August 25, 2020 | |
| INVENTOR(S) | : Sharifi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1026 days.

Signed and Sealed this
Eighth Day of June, 2021

Drew Hirshfeld
*Performing the Functions and Duties of the
Under Secretary of Commerce for Intellectual Property and
Director of the United States Patent and Trademark Office*